(12) United States Patent
Takahashi et al.

(10) Patent No.: US 7,253,215 B2
(45) Date of Patent: *Aug. 7, 2007

(54) ANTI-GLARE FILM, AND OPTICAL MEMBER AND LIQUID CRYSTAL DISPLAY APPARATUS USING THE SAME

(75) Inventors: Hiroshi Takahashi, Himeji (JP); Hiroaki Ushida, Izumiotsu (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/206,884

(22) Filed: Aug. 19, 2005

(65) Prior Publication Data

US 2006/0036020 A1    Feb. 16, 2006

Related U.S. Application Data

(62) Division of application No. 10/320,612, filed on Dec. 17, 2002, now Pat. No. 6,945,656.

(30) Foreign Application Priority Data

Dec. 17, 2001 (JP) ............................. 2001-383427
Jul. 29, 2002 (JP) ............................. 2002-220162

(51) Int. Cl.
*C08F 2/46* (2006.01)
*G02B 1/11* (2006.01)

(52) U.S. Cl. ................ 522/110; 522/109; 522/90; 522/96; 522/112; 522/111; 522/182; 522/84; 522/85; 522/86; 522/88; 359/599; 359/600; 359/601; 252/582; 252/589; 264/1.31; 264/1.34; 264/1.36; 264/1.38; 264/1.9; 264/1.7; 428/1.1; 428/1.6

(58) Field of Classification Search ............ 522/90, 522/96, 112, 111, 110, 109, 182, 84, 85, 86, 522/88; 359/599, 601, 60; 252/582, 589; 264/1.31, 1.34, 1.36, 1.38, 1.9, 1.7; 428/1.1, 428/1.6

See application file for complete search history.

(56) References Cited

U.S. PATENT DOCUMENTS

| | | |
|---|---|---|
| 5,108,857 A | 4/1992 | Kitayama et al. |
| 5,851,700 A | 12/1998 | Honda et al. |
| 6,177,153 B1 | 1/2001 | Uchiyama et al. |
| 6,217,176 B1 | 4/2001 | Maekawa |
| 6,404,471 B1 | 6/2002 | Hatanaka et al. |
| 6,424,395 B1 | 7/2002 | Sato et al. |
| 6,573,958 B2 | 6/2003 | Takahashi et al. |
| 2004/0196558 A1* | 10/2004 | Takahashi et al. .......... 359/613 |
| 2004/0266941 A1* | 12/2004 | Houston et al. ............ 524/506 |

FOREIGN PATENT DOCUMENTS

| | | |
|---|---|---|
| JP | 2001-215307 A | 8/2001 |
| JP | 2001-264508 A | 9/2001 |
| JP | 2001-281411 A | 10/2001 |

* cited by examiner

*Primary Examiner*—Sanza L. McClendon
(74) *Attorney, Agent, or Firm*—Birch, Stewart, Kolasch and Birch, LLP

(57) ABSTRACT

Anti-glare film including anti-glare layer. The anti-glare film is obtained by coating or casting a liquid compositions containing a polymer, a curable resin precursor, and a solvent on a transparent plastic film, evaporating the solvent, forming a phase separation structure by spinodal decomposition, and curing the curable resin precursor by irradiation with light. The disclosed anti-glare film prevents reflection of surrounding scenery and dazzle in a display surface.

5 Claims, 2 Drawing Sheets

ANTI-GLARE FILM, AND OPTICAL MEMBER AND LIQUID CRYSTAL DISPLAY APPARATUS USING THE SAME

This application is a Divisional of application Ser. No. 10/320,612 filed on Dec. 17, 2002, now U.S. Pat. No. 6,945,656 and for which priority is claimed under 35 U.S.C. § 120; and this application claims priority of Application No. 200 1-383427 filed in Japan on Dec. 17, 2001 and Application No. 2002-220162 filed in Japan on Jul. 29, 2002 under 35 U.S.C. § 119; the entire contents of all are hereby incorporated by reference.

FIELD OF THE INVENTION

This invention relates to an anti-glare (glare proof) film suitable for preventing dazzle and reflection of an exterior light source in display surfaces of various display apparatuses (or devices), and a process for producing the film, as well as an optical member with the film.

BACKGROUND OF THE INVENTION

To prevent reflection of a surrounding scenery in a display surface of a liquid crystal display apparatus or others, the display surface is usually kept away from regular reflection by coating or applying a mixture of a fine particle and a binder resin or thermosetting resin on a support to form finely uneven (rough) structure on the surface, and is provided with anti-glareness. However, in a high definition display apparatus which has a small pixel size, a conventionally used surface-uneven size brings about debasement of an image such as dazzle in display and blur of images. That is, in the case of a high definition display apparatus, a degree of a conventionally used surface-uneven size is close to that of the pixel size in the high definition display, and dazzle is generated due to a lens effect caused by the surface unevenness. Moreover, since the centroid position of the fine particles is unable to control in the inside and surface structures of a coat layer, the transmitted scattered-light distribution shows the Gaussian distribution with a central focus on a rectilinear transmitted light. In a conventional pixel size, accordingly, the scatteration on the periphery of the rectilinear transmitted light increases, and the pixel border becomes vague or unclear, as a result blur of images occurs. Further, the intensity distribution of the transmitted scattered-light depends on the size a fine particle to be added. In the case of adding a smaller fine particle, the scatteration around the rectilinear transmitted light decreases, and dazzle is reduced. In the case of adding a larger fine particle, the scatteration around the rectilinear transmitted light increases, and dazzle is generated.

To solve these problems, there has been tried to minify a size of a fine particle to be added, or to control an uneven shape of the surface with the use of particles having a limited particle size distribution. In these manners, however, it is necessary for preventing dazzle or blur of images to control the centroid position of the fine particles. Moreover, since the uneven shape of the surface becomes smaller, compatibility of adequate anti-glareness is difficult to attain and disadvantageous from the viewpoint of cost performance.

Japanese Patent Application Laid-Open No. 215307/2001 (JP-2001-215307A) discloses an anti-glare layer containing a transparent fine particle having the mean particle size of 15 µm in a coat layer whose thickness is not less than twice of the mean particle size, wherein the anti-glare layer forms a surface having a finely uneven structure through unevenly distributing the transparent fine particles in one side being in touch with air of the coat layer. This literature also discloses the anti-glare layer supported by a transparent support film, and an optical member comprising the anti-glare layer in at least one side of a polarizing plate.

Japanese Patent Application Laid-Open No. 264508/2001 (JP-2001-264508A) discloses an anti-glare antireflection film comprising an anti-glare hardcoat layer and a low reflective index layer sequentially formed on a transparent support, wherein the anti-glare hardcoat layer contains particles having the mean particle size of 1 to 10 µm, and the low reflective index layer contains inorganic fine particles having the mean particle size of 0.001 to 0.2 µm, a hydrolysate of a photo-curable organosilane and/or a partial condensate thereof and a fluorene-containing polymer, and has the reflective index of 1.35 to 1.49.

Japanese Patent Application Laid-Open No. 281411/2001 (JP-2001-281411A) discloses an anti-glare antireflection film having similar composition as that recited in Japanese Patent Application Laid-Open No. 264508/2001 (JP-2001-264508A), wherein the film has the visibility of a transmitted image using an optical slit of 0.5 mm width being 30 to 70%.

Also in such films, however, since the intensity distribution of the transmitted scattered-light is controlled with a particle size thereof, it is impossible to prevent dazzle or blur of images in the display surface. Moreover, these films have a disadvantage from the viewpoint of cost performance due to using a special fine particle and coating with double-layer.

SUMMARY OF THE INVENTION

It is, therefore, an object of the present invention to provide an anti-glare film having a high anti-glareness (anti-dazzle property) and being capable of preventing reflection of a surrounding scenery and dazzle in a display surface even in a high definition display apparatus, a process for producing the anti-glare film, and an optical member (or polarizing plate) and a display apparatus or device (liquid crystal display apparatus, plasma display, touch panel-equipped input device) with the anti-glare film.

It is another object of the present invention to provide an anti-glare film being capable of preventing blur of images in a display surface even in a high definition display apparatus, a process for producing the anti-glare film, and an optical member (or polarizing plate) and a display apparatus or device (liquid crystal display apparatus, plasma display, touch panel-equipped input device) with the anti-glare film.

It is still another object of the invention to provide an anti-glare film having high abrasion resistance and being useful for controlling the intensity distribution of the transmitted scattered-light, a process for producing the anti-glare film, and a optical member (or polarizing plate) and a display apparatus or device (liquid crystal display apparatus, plasma display, touch panel-equipped input device) with the anti-glare film.

The inventors of the present invention made intensive studies to achieve the above objects and finally found that, in a process which comprises preparing a solution uniformly dissolved at least one polymer and at least one curable resin precursor in a solvent and evaporating the solvent from the solution to produce a sheet, spinodal decomposition under an appropriate condition followed by curing the precursor ensures a phase-separation structure having regularity and an uneven surface structure corresponding to the phase structure, and that application of such an anti-glare layer having a regular phase-separation structure to a high definition display apparatus ensures effective elimination of dazzle and blur of images in the display surface. The present invention was accomplished based on the above finding.

That is, the anti-glare film of the present invention comprises at least an anti-glare layer, and the anti-glare layer has an uneven surface structure. Further, the anti-glare layer isotropically transmits and scatters an incident light to show the maximum value of the scattered light intensity at a scattering angle of 0.1 to 10° (preferably 1 to 10°), and has a total light transmittance of 70 to 100% (preferably 80 to 100%). That is, a light transmitted and scattered through the anti-glare layer (transmitted scattered-light) has a scattering peak separated from a rectilinear transmitted light. The anti-glare layer may have a visibility of a transmitted image of 70 to 100% measured by an image clarity measuring apparatus provided with an optical slit of 0.5 mm width, and may have a haze of 20 to 50%.

The anti-glare layer comprises at least one polymer and at least one curable resin precursor, and in the layer, at least two components selected from the group consisting of the polymers and the precursors [for example, (i) a plurality of polymers, (ii) a combination of a polymer and a curable resin precursor, or (iii) a plurality of curable resin precursors] are phase-separated by spinodal decomposition from a liquid phase, and the precursor is cured. The anti-glare layer may comprise a plurality of polymers being phase-separable each other by spinodal decomposition [for example, a combination of a cellulose derivative with a styrenic resin, a (meth)acrylic resin, an alicyclic olefinic resin, a polycarbonate-series resin, a polyester-series resin, and the like], and the curable resin precursor being compatible with at least one polymer of the plurality of polymers. At least one polymer of the plurality of polymers may have a functional group [for example, a polymerizable group such as a (meth)acryloyl group] participating or reacting in a curing reaction of the curable resin precursor. The curable resin precursor may comprise, for example, an epoxy (meth)acrylate, a urethane (meth)acrylate, a polyester (meth)acrylate, a silicone (meth)acrylate, a polyfunctional monomer having at least two polymerizable unsaturated bonds, and others. Incidentally, the thermoplastic resin and the curable resin precursor are usually incompatible with each other. Further, hardcoat properties (or abrasion resistance) may be imparted to the anti-glare layer by curing the curable resin precursor, or the anti-glare layer may have a regular or periodical phase-separation structure fixed by curing the curable resin precursor. The anti-glare layer may, for example, be cured with an actinic ray (e.g., an ultraviolet ray, an electron beam), a thermal source, and other means. Moreover, the anti-glare layer usually contains a polymer and a cured resin or curable resin precursor, and the weight ratio of the former relative to the latter may be 5/95 to 60/40.

The anti-glare film may comprise an anti-glare layer alone, or a transparent support (e.g., a transparent polymer film for forming an optical member) and an anti-glare layer formed on the transparent support.

In the present invention, an optical member (or a laminated optical member) can be obtained by laminating the anti-glare film (that is, an anti-glare film comprising an anti-glare layer alone, or a laminated film of a support and an anti-glare layer) on at least one light path surface (or one side) of an optical element (such as a polarizing plate). The optical member ensures prevention of dazzle in a display surface and impartment of high abrasion resistance to the optical element (such as a polarizing plate) by using the anti-glare film instead of a protective film for the optical element (e.g., a protective film for both sides of a polarizing plate). The film of the present invention is, accordingly, also preferably utilized for a display device or apparatus such as a liquid crystal display apparatus, a plasma display and a touch panel-equipped input device.

The present invention also includes a composition for an anti-glare film which comprises at least one polymer and at least one curable resin precursor, and in which at least two components selected from the group consisting of the polymers and the precursors are phase-separable by spinodal decomposition from a liquid phase. The composition may comprise a plurality of polymers being phase-separable by spinodal decomposition, and the curable resin precursor being compatible with at least one polymer of the plurality of polymers. At least one polymer of the plurality of polymers may have a functional group participating or reacting in a curing reaction of the curable resin precursor.

A process for producing the anti-glare film comprising at least an anti-glare layer may, for example, comprise forming a phase separation structure by spinodal decomposition from a liquid phase, curing the resin precursor to form the anti-glare layer, and the liquid phase contains at least one polymer, at least one curable resin precursor, and a solvent. The above-mentioned spinodal decomposition from a liquid phase may be carried out by evaporating the solvent. For forming a phase separation structure, (i) a plurality of polymers, (ii) a combination of a polymer and a curable resin precursor, or (iii) a plurality of curable resin precursors may be used. The process may comprise forming a phase separation structure by spinodal decomposition from a composition composed of a thermoplastic resin, a photo-curable compound (such as a photo-curable monomer or oligomer), a photopolymerization initiator, and a solvent (common solvent) for dissolving the thermoplastic resin and the photo-curable compound; and forming an anti-glare layer by a light irradiation. Moreover, the process may comprise forming a phase separation structure by spinodal decomposition from a composition composed of a thermoplastic resin, a resin being incompatible with the thermoplastic resin and having a photo-curable group, a photo-curable compound, a photopolymerization initiator, and a solvent for dissolving the resin and the photo-curable compound; and forming an anti-glare layer by a light irradiation. These processes may comprise forming at least one anti-glare layer on a transparent support.

DETAILED DESCRIPTION OF THE INVENTION

[Anti-Glare Film]

Figure 1:
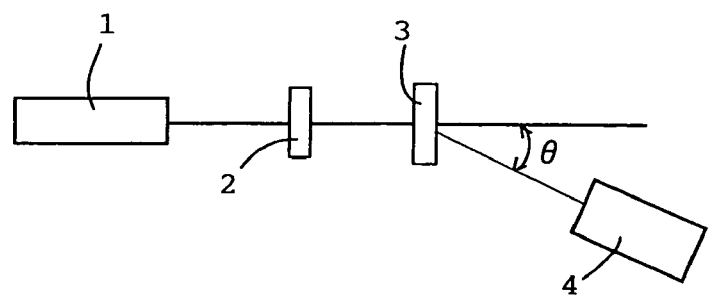
FIG. 1 is a schematic illustration showing an equipment for measuring an angle distribution of a transmitted light.

The anti-glare (glare proof or anti-dazzle) film comprises at least an anti-glare layer, and a phase separation structure (phase-separated structure) of the anti-glare layer is formed by spinodal decomposition from a liquid phase (wet spinodal decomposition). That is, by using a resin composition of the present invention which contains a polymer, a curable resin precursor and a solvent, during a step of evaporating or removing a solvent from a liquid phase (or a uniform solution or a coat layer thereof) in the resin composition with drying or other means, a phase separation by spinodal decomposition can be generated depending on condensation of the liquid phase, and a phase-separated structure in which the distance between phases is relatively regular can be formed. More specifically, the above-mentioned wet spinodal decomposition can be usually carried out by coating a support with a liquid mixture or resin composition (uniform solution) containing at least one polymer, at least one curable resin precursor and a solvent, and by evaporating the solvent from the coat layer. In the case of using an exfoliative support as the support, an anti-glare film composed of an anti-glare layer alone can be obtained by exfoliating the anti-glare layer from the support. Further, an anti-glare film having a lamination structure composed of a support and an anti-glare layer can be obtained with the use of a non-exfoliative support (preferably a transparent support) as the support.

(Polymer Component)

As a polymer component, a thermoplastic resin is usually employed. As the thermoplastic resin, there may be exemplified a styrenic resin, a (meth)acrylic resin, an organic acid vinyl ester-series resin, a vinyl ether-series resin, a halogen-containing resin, an olefinic resin (including an alicyclic olefinic resin), a polycarbonate-series resin, a polyester-series resin, a polyamide-series resin, a thermoplastic polyurethane resin, a polysulfone-series resin (e.g., a polyether sulfone, a polysulfone), a polyphenylene ether-series resin (e.g., a polymer of 2,6-xylenol), a cellulose derivative (e.g., a cellulose ester, a cellulose carbamate, a cellulose ether), a silicone resin (e.g., a polydimethylsiloxane, a polymethylphenylsiloxane), a rubber or elastomer (e.g., a diene-series rubber such as a polybutadiene and a polyisoprene, a styrene-butadiene copolymer, an acrylonitrile-butadiene copolymer, an acrylic rubber, a urethane rubber, a silicone rubber), and the like. The thermoplastic resin(s) may be used singly or in combination.

The styrenic resin includes a homo- or copolymer of a styrenic monomer (e.g. a polystyrene, a styrene-α-methylstyrene copolymer, a styrene-vinyl toluene copolymer) and a copolymer of a styrenic monomer and other polymerizable monomer [e.g., a (meth)acrylic monomer, maleic anhydride, a maleimide-series monomer, a diene]. The styrenic copolymer includes, for example, a styrene-acrylonitrile copolymer (AS resin), a copolymer of styrene and a (meth)acrylic monomer [e.g., a styrene-methyl methacrylate copolymer, a styrene-methyl methacrylate-(meth)acrylate copolymer, a styrene-methyl methacrylate-(meth)acrylic acid copolymer], and a styrene-maleic anhydride copolymer. The preferred styrenic resin includes a polystyrene, a copolymer of styrene and a (meth)acrylic monomer [e.g., a copolymer comprising styrene and methyl methacrylate as a main component, such as a styrene-methyl methacrylate copolymer], an AS resin, a styrene-butadiene copolymer and the like.

As the (meth)acrylic resin, a homo- or copolymer of a (meth)acrylic monomer and a copolymer of a (meth)acrylic monomer and a copolymerizable monomer can be employed. As the (meth)acrylic monomer, there may be mentioned, for example, (meth)acrylic acid; a $C_{1-10}$alkyl (meth)acrylate such as methyl (meth)acrylate, ethyl (meth) acrylate, butyl (meth)acrylate, t-butyl (meth)acrylate, isobutyl (meth)acrylate, hexyl (meth)acrylate, octyl (meth)acrylate and 2-ethylhexyl (meth)acrylate; an aryl (meth)acrylate such as phenyl (meth)acrylate; a hydroxyalkyl (meth)acrylate such as hydroxyethyl (meth)acrylate and hydroxypropyl (meth)acrylate; glycidyl (meth)acrylate; an N,N-dialkylaminoalkyl (meth)acrylate; (meth)acrylonitrile; a (meth)acrylate having an alicyclic hydrocarbon group such as tricyclodecane. The copolymerizable monomer includes the above styrenic monomer, a vinyl ester-series monomer, maleic anhydride, maleic acid, and fumaric acid. The monomer(s) may be used singly or in combination.

As the (meth)acrylic resin, there may be mentioned a poly(meth)acrylate such as a poly (methyl methacrylate), a methyl methacrylate-(meth)acrylic acid copolymer, a methyl methacrylate-(meth)acrylate copolymer, a methyl methacrylate-acrylate-(meth)acrylic acid copolymer, and a (meth)acrylate-styrene copolymer (MS resin). The preferred (meth)acrylic resin includes a methyl methacrylate-series resin containing a poly($C_{1-6}$alkyl (meth)acrylate) such as a poly(methyl (meth)acrylate), particularly methyl methacrylate, as a main component (about 50 to 100% by weight, and preferably about 70 to 100% by weight).

As the organic acid vinyl ester-series resin, there may be mentioned a homo- or copolymer of a vinyl ester-series monomer (e.g., a polyvinyl acetate, a polyvinyl propionate), a copolymer of a vinyl ester-series monomer and a copolymerizable monomer (e.g., an ethylene-vinyl acetate copolymer, a vinyl acetate-vinyl chloride copolymer, a vinyl acetate-(meth)acrylate copolymer), or a derivative thereof. The derivative of the vinyl ester-series resin includes a polyvinyl alcohol, an ethylene-vinyl alcohol copolymer, a polyvinyl acetal resin, and the like.

As the vinyl ether-series resin, a homo- or copolymer of a vinyl $C_{1-10}$alkyl ether such as vinyl methyl ether, vinyl ethyl ether, vinyl propyl ether and vinyl t-butyl ether, and a copolymer of a vinyl $C_{1-10}$alkyl ether and a copolymerizable monomer (e.g., a vinyl alkyl ether-maleic anhydride copolymer).

The halogen-containing resin includes a polyvinyl chloride, a polyvinylidene fluoride, a vinyl chloride-vinyl acetate copolymer, a vinyl chloride-(meth)acrylate copolymer, a vinylidene chloride-(meth)acrylate copolymer, and the like.

The olefinic resin includes, for example, an olefinic homopolymer such as a polyethylene and a polypropylene, a copolymer such as an ethylene-vinyl acetate copolymer, an ethylene-vinyl alcohol copolymer, an ethylene-(meth) acrylic acid copolymer and an ethylene-(meth)acrylate copolymer. As the alicyclic olefinic resin, there may be mentioned a homo- or copolymer of a cyclic olefin such as norbornene and dicyclopentadiene (e.g., a polymer having an alicyclic hydrocarbon group such as tricyclodecane which is sterically rigid), a copolymer of the cyclic olefin and a copolymerizable monomer (e.g., an ethylene-norbornene copolymer, a propylene-norbornene copolymer). The alicyclic olefinic resin is available as, for example, the trade name "ARTON", the trade name "ZEONEX" and the like.

The polycarbonate-series resin includes an aromatic polycarbonate based on a bisphenol (e.g., bisphenol A) and an aliphatic polycarbonate such as diethylene glycol bisallyl carbonate.

The polyester-series resin includes an aromatic polyester obtainable from an aromatic dicarboxylic acid such as terephthalic-acid (a homopolyester, e.g. a poly$C_{2-4}$alkylene terephthalate such as a polyethylene terephthalate and a polybutylene terephthalate, a poly$C_{2-4}$alkylene naphthalate, and a copolyester comprising a $C_{2-4}$alkylene arylate unit (a $C_{2-4}$alkylene terephthalate unit and/or a $C_{2-4}$alkylene naphthalate unit) as a main component (e.g., not less than 50% by weight). The copolyester includes a copolyester in which, in constituting units of a poly$C_{2-4}$alkylene arylate, a part of $C_{2-4}$alkylene glycols is substituted with a polyoxy$C_{2-4}$alkylene glycol, a $C_{6-10}$alkylene glycol, an alicyclic diol (e.g., cyclohexane dimethanol, hydrogenated bisphenol A), a diol having an aromatic ring (e.g., 9,9-bis(4-(2-hydroxyethoxy) phenyl)fluorene having a fluorenone side chain, a bisphenol A, a bisphenol A-alkylene oxide adduct) or the like, and a copolyester in which, in constituting units, a part of aromatic dicarboxylic acids is substituted with an unsymmetric aromatic dicarboxylic acid such as phthalic acid and isophthalic acid, an aliphatic $C_{6-12}$dicarboxylic acid such as adipic acid or the like. The polyester-series resin also includes a polyarylate-series resin, an aliphatic polyester obtainable from an aliphatic dicarboxylic acid such as adipic acid, and a homo- or copolymer of a lactone such as ε-caprolactone. The preferred polyester-series resin is usually non-crystalline resin, such as a non-crystalline copolyester (e.g., a $C_{2-4}$alkylene arylate-series copolyester).

The polyamide-series resin includes an aliphatic polyamide such as nylon 46, nylon 6, nylon 66, nylon 610, nylon 612, nylon 11 and nylon 12, and a polyamide obtained from a dicarboxylic acid (e.g., terephthalic acid, isophthalic acid, adipic acid) and a diamine (e.g., hexamethylene diamine, metaxylylenediamine). The polyamide-series resin may be a homo- or copolymer of a lactam such as ε-caprolactam, and is not limited to a homopolyamide but may be a copolyamide.

Among the cellulose derivatives, the cellulose ester includes, for example, an aliphatic organic acid ester of a cellulose (e.g., a $C_{1-6}$organic acid ester of a cellulose such as a cellulose acetate (e.g., a cellulose diacetate, a cellulose triacetate), a cellulose propionate, a cellulose butyrate, a cellulose acetate propionate, and a cellulose acetate butyrate), an aromatic organic acid ester of a cellulose (e.g. a $C_{7-12}$aromatic carboxylic acid ester of a cellulose such as a cellulose phthalate and a cellulose benzoate), an inorganic acid ester of a cellulose (e.g., a cellulose phosphate, a cellulose sulfate), and may be a mixed acid ester of a cellulose such as a cellulose acetate nitrate. The cellulose derivative also includes a cellulose carbamate (e.g. a cellulose phenylcarbamate), a cellulose ether (e.g., a cyanoethylcellulose; a hydroxy$C_{2-4}$alkyl cellulose such as a hydroxyethylcellulose and a hydroxypropylcellulose; a $C_{1-6}$alkyl cellulose such as a methyl cellulose and an ethyl cellulose; a carboxymethyl cellulose or a salt thereof, a benzyl cellulose, an acetyl alkyl cellulose).

The preferred thermoplastic resin includes, for example, a styrenic resin, a (meth)acrylic resin, a vinyl acetate-series resin, a vinyl ether-series resin, a halogen-containing resin, an alicyclic olefinic resin, a polycarbonate-series resin, a polyester-series resin, a polyamide-series resin, a cellulose derivative, a silicone-series resin, and a rubber or elastomer, and the like. As the resin, there is usually employed a resin which is non-crystalline and is soluble in an organic solvent (particularly a common solvent for dissolving a plurality of polymers and curable monomers). In particular, a resin which is excellent in moldability or film-forming (film-formable) properties, transparency, and weather resistance [for example, a styrenic resin, a (meth)acrylic resin, an alicyclic olefinic resin, a polyester-series resin, a cellulose derivative (e.g., a cellulose ester)] is preferred.

As the polymer component, there may be also used a polymer having a functional group participating or reacting in a curing reaction (or a functional group capable of reacting with the curable compound). The above-mentioned polymer may have the functional group in a main chain thereof, or in a side chain thereof. The functional group may be introduced into a main chain of the polymer with co-polymerization, co-condensation or the like, and is usually introduced into a side chain of the polymer. Such a functional group includes a condensable group or reactive group (for example, a hydroxyl group, an acid anhydride group, a carboxyl group, an amino or imino group, an epoxy group, a glycidyl group, and an isocyanate group), a polymerizable group [for example, a $C_{2-6}$alkenyl group such as vinyl, propenyl, isopropenyl, butenyl and allyl, a $C_{2-6}$alkynyl group such as ethynyl, propynyl and butynyl, a $C_{2-6}$alkenylidene group such as vinylidene, or a group having the polymerizable group(s) (e.g., (meth)acryloyl group)], and others. Among these functional groups, the polymerizable group is preferred.

As a process for introducing the polymerizable group in a side chain of the polymer, for example, there may be utilized a process of reacting a thermoplastic resin having a functional group such as a reactive group or condensable group, with a polymerizable compound having a group reactive to the functional group.

Exemplified as the thermoplastic resin having a functional group is a thermoplastic resin having a carboxyl group or an acid anhydride group thereof (e.g., a (meth)acrylic resin, a polyester-series resin, a polyamide-series resin), a thermoplastic resin having a hydroxyl group (e.g., a (meth)acrylic resin, a polyurethane-series resin, a cellulose derivative, a polyamide-series resin), a thermoplastic resin having an amino group (e.g., a polyamide-series resin), a thermoplastic resin having an epoxy group (e.g., a (meth)acrylic resin or polyester-series resin having an epoxy group), and others. Moreover, such a resin may also be a resin in which the functional group is introduced into a thermoplastic resin (such as a styrenic resin, an olefinic resin, and an alicyclic olefinic resin) with co-polymerization or graft polymerization.

As the polymerizable compound, in the case of a thermoplastic resin having a carboxyl group or an acid anhydride group thereof, there may be used a polymerizable compound having an epoxy group, a hydroxyl group, an amino group, an isocyanate group or the like. In the case of a thermoplastic resin having a hydroxyl group, there may be mentioned a polymerizable compound having a carboxyl group or an anhydride group thereof, an isocyanate group or the like. In the case of a thermoplastic resin having an amino group, there may be mentioned a polymerizable compound having a carboxyl group or an anhydride group thereof, an epoxy group, an isocyanate group or the like. In the case of a thermoplastic resin having an epoxy group, there may be mentioned a polymerizable compound having a carboxyl group or an acid anhydride group thereof, an amino group or the like.

Among the above-mentioned polymerizable compounds, as the polymerizable compound having an epoxy group, for example, there may be mentioned an epoxycyclo$C_{5-8}$alkenyl (meth)acrylate such as epoxycyclohexenyl (meth)acrylate, glycidyl(meth)acrylate, and allyl glycidyl ether. As the polymerizable compound having a hydroxyl group, for example, there may be mentioned a hydroxy$C_{1-4}$alkyl (meth)acrylate such as hydroxypropyl (meth)acrylate, a hydroxy$C_{2-6}$alkylene glycol (meth)acrylate such as ethylene glycol mono (meth)acrylate. As the polymerizable compound having an amino group, for example, there may be mentioned an amino$C_{1-4}$alkyl (meth)acrylate such as aminoethyl (meth)acrylate, a $C_{3-6}$alkenylamine such as allylamine, an aminostyrene such as 4-aminostyrene and diaminostyrene. As the polymerizable compound having an isocyanate group, for example, there may be mentioned a polyurethane (meth)

acrylate and vinyl isocyanate. As the polymerizable compound having a carboxyl group or an acid anhydride group thereof, for example, there may be mentioned an unsaturated carboxylic acid or anhydride thereof such as a (meth)acrylic acid and maleic anhydride.

As typical examples, the following combinations are included: a thermoplastic resin having a carboxyl group or an acid anhydride group thereof, and an epoxy group-containing compound; particularly a (meth)acrylic resin [e.g., a (meth)acrylic acid-(meth)acrylic ester copolymer] and an epoxy group-containing (meth)acrylate [e.g., an epoxycycloalkenyl (meth)acrylate, a glycidyl (meth)acrylate]. Concretely, there may be used a polymer in which a polymerizable unsaturated group(s) is(are) incorporated in part of carboxyl groups in a (meth)acrylic resin, for example, a (meth)acrylic polymer which is obtained by reacting an epoxy group(s) of 3,4-epoxycyclohexenyl methyl acrylate with part of carboxyl groups of (meth) acrylic acid-(meth)acrylate copolymer to introduce a photopolymerizable unsaturated group(s) in a side chain(s) of the polymer (CYCLOMER-P, manufactured by Daicel Chemical Industries, Ltd.).

The introduction amount of the functional group (particularly the polymerizable group) participating or reacting in a curing reaction of the thermoplastic resin is about 0.001 to 10 mol, preferably about 0.01 to 5 mol, and more preferably about 0.02 to 3 mol relative to 1 kg of the thermoplastic resin.

The polymer(s) may be used in a suitable combination. That is, the polymer may comprise a plurality of polymers. The plurality of polymers may be capable of phase separation by spinodal decomposition from a liquid phase. Moreover, the plurality of polymers may be incompatible with each other. In the case combining a plurality of polymers, the combination of a first resin with a second resin is not particularly limited, and a plurality of polymers incompatible with each other in the neighborhood of a processing temperature, for example two polymers incompatible with each other, may be used in a suitable combination. For example, in the case where the first resin is a styrenic resin (e.g., a polystyrene, a styrene-acrylonitrile copolymer), the second resin may be a cellulose derivative (e.g., a cellulose ester such as a cellulose acetate propionate), a (meth)acrylic resin (e.g., a poly(methyl methacrylate)), an alicyclic olefinic resin (e.g., a polymer obtained by using norbornene as a monomer), a polycarbonate-series resin, a polyester-series resin (e.g., the above-mentioned polyC$_{2-4}$alkylene arylate-series copolyester), and others. Moreover, for example, in the case where a first polymer is a cellulose derivative (e.g., a cellulose ester such as cellulose acetate propionate), a second polymer may be a styrenic resin (e.g., a polystyrene, a styrene-acrylonitrile copolymer), a (meth)acrylic resin, an alicyclic olefinic resin (e.g., a polymer obtained by using norbornene as a monomer), a polycarbonate-series resin, a polyester-series resin (e.g., the above-mentioned polyC$_{2-4}$ alkylene arylate-series copolyester), and others. In the combination of a plurality of resins, there may be used at least a cellulose ester (for example, C$_{2-4}$alkylcarboxylic acid ester of a cellulose such as a cellulose diacetate, a cellulose triacetate, a cellulose acetate propionate, and a cellulose acetate butyrate).

Incidentally, the phase separation structure generated by spinodal decomposition is finally cured with an actinic ray (e.g., an ultraviolet ray, an electron beam), a thermal source or other means to form a cured resin. Accordingly, abrasion resistance can be imparted to the anti-glare layer, and durability of the layer can be improved.

From the viewpoint of abrasion resistance after curing, at least one of the plurality of polymers, e.g., one of polymers incompatible with each other (in the case of using a first resin with a second resin in combination, particularly both polymers) is preferably a polymer having a functional group, reactive to the curable resin precursor, in a side chain thereof.

The ratio (weight ratio) of the first polymer relative to the second polymer [the first polymer/the second polymer] may be selected within the range of, for example, about 1/99 to 99/1, preferably about 5/95 to 95/5 and more preferably about 10/90 to 90/10, and is usually about 20/80 to 80/20, particularly about 30/70 to 70/30.

Incidentally, the polymer for forming a phase separation structure may comprise the thermoplastic resin or other polymer(s) in addition to the above-mentioned two polymers incompatible with each other.

The glass transition temperature of the polymer may be selected within the range of, for example, about −100° C. to 250° C., preferably about −50° C. to 230° C., and more preferably about 0° C. to 200° C. (for example, about 50° C. to 180° C.). It is advantageous from the viewpoint of surface hardness that the glass transition temperature is not less than 50° C. (e.g., about 70° C. to 200° C.), and preferably not less than 100° C. (e.g., about 100° C. to 170° C.). The weight-average molecular weight of the polymer may, for example, be selected within the range of not more than 1,000,000, and preferably about 1,000 to 500,000.

(Curable Resin Precursor)

As the curable resin precursor, there may be used various curable compounds having a functional group reactive to a thermal source or an actinic ray (e.g., an ultraviolet ray, an electron beam), and being capable of forming a resin (particularly a cured or crosslinked resin) by curing or crosslinking with a thermal source or an actinic ray. For example, as the resin precursor, there may be mentioned a thermosetting compound or resin [a low molecular weight compound having an epoxy group, a polymerizable group, an isocyanate group, an alkoxysilyl group, a silanol group or others (e.g., an epoxy-series resin, an unsaturated polyester-series resin, a urethane-series resin, and a silicone-series resin)], and a photo-curable compound which is curable with an actinic ray (such as ultraviolet ray) (e.g., a ultraviolet curable compound such as a photo-curable monomer and oligomer). The photo-curable compound may be an EB (electron beam) curable compound, or others. Incidentally, the photo-curable compounds such as a photo-curable monomer or oligomer, and a photo-curable resin which may have low molecular weight is sometimes simply referred to as "photo-curable resin".

The photo-curable compound includes, for example, a monomer, and an oligomer (or a resin, particularly a resin having low molecular weight). As the monomer, for example, there may be exemplified a monofunctional monomer [for example, a (meth)acrylic monomer such as a (meth)acrylic ester, a vinyl-series monomer such as vinylpyrrolidone, and a (meth)acrylate having a crosslinked cyclic hydrocarbon group (e.g., isobornyl (meth)acrylate, and adamantyl (meth)acrylate)], a polyfunctional monomer having at least two polymerizable unsaturated bonds [for example, an alkylene glycol di(meth)acrylate such as ethylene glycol di(meth)acrylate, propylene glycol di(meth) acrylate, butanediol di(meth)acrylate, neopentyl glycol di (meth)acrylate, and hexanediol di(meth)acrylate; a (poly) oxyalkylene glycol di(meth)acrylate such as diethylene glycol di(meth)acrylate, dipropylene glycol di(meth)acrylate, and a polyoxytetramethylene glycol di(meth)acrylate; a di(meth)acrylate having a crosslinked cyclic hydrocarbon group (e.g., tricyclodecane dimethanol di(meth)acrylate, and adamantane di(meth)acrylate); and a polyfunctional monomer having about 3 to 6 polymerizable unsaturated bonds (e.g., trimethylol propane tri(meth)acrylate, trimethylol ethane tri(meth)acrylate, pentaerythritol tri(meth)acrylate, pentaerythritol tetra(meth)acrylate, and dipentaerythritol penta(meth)acrylate)].

As the oligomer or resin, there may be exemplified a (meth)acrylate of a bisphenol A added with an alkylene oxide, an epoxy (meth)acrylate (e.g., a bisphenol A-based epoxy (meth)acrylate, and a novolak-based epoxy (meth) acrylate), a polyester (meth)acrylate (e.g., an aliphatic polyester-based (meth)acrylate, and an aromatic polyester-based (meth)acrylate), a polyurethane (meth)acrylate (e.g., a polyester-based urethane (meth)acrylate, and a polyether-based urethane (meth)acrylate), a silicone (meth)acrylate, and others. The photo-curable compound(s) may be used singly or in combination.

The preferred curable resin precursor is a photo-curable compound curable in a short time, for example, an ultraviolet curable compound (e.g., a monomer, an oligomer, and a resin which may be a low molecular weight resin), and an EB curable resin. In particular, a practically advantageous resin precursor is an ultraviolet curable resin. Further, to improve resistance such as abrasion resistance, a photo-curable resin is preferably a compound having polymerizable unsaturated bonds of not less than 2 (preferably about 2 to 6, and more preferably about 2 to 4) in the molecule.

The molecular weight of the curable resin precursor is, allowing for compatibility to the polymer, not more than about 5000, preferably not more than about 2000, and more preferably not more than about 1000.

The curable resin precursor may comprise a curing agent depending on the variety. For example, a thermosetting resin may comprise a curing agent such as an amine and a polyfunctional carboxylic acid, and a photo-curable resin may comprise a photopolymerization initiator. As the photopolymerization initiator, there may be exemplified a conventional component, e.g., an acetophenone, a propiophenone, a benzyl, a benzoin, a benzophenone, a thioxanthone, an acylphosphine oxide, and others. The content of the curing agent (such as a photo curing agent) relative to 100 parts by weight of the curable resin precursor is about 0.1 to 20 parts by weight, preferably about 0.5 to 10 parts by weight, and more preferably about 1 to 8 parts by weight (particularly about 1 to 5 parts by weight), and may be about 3 to 8 parts by weight.

Further, the curable resin precursor may comprise a curing accelerator. For example, the photo-curable resin may, for example, comprise a photo-curing accelerator such as a tertiary amine (e.g., a dialkylaminobenzoic ester) and a phosphine-series photopolymerization accelerator.

Among at least one polymer and at least one curable resin precursor, at least two components are used in such a combination as they are phase-separated with each other in the neighborhood of a processing temperature. As such a combination, for example, there may be mentioned (a) a combination in which a plurality of polymers are incompatible with each other and form a phase separation, (b) a combination in which a polymer and a curable resin precursor are incompatible with each other and form a phase separation, (c) a combination in which a plurality of curable resin precursors are incompatible with each other and form a phase separation, and other combinations. Among these combinations, (a) the combination of the plurality of polymers or (b) the combination of the polymer with the curable resin precursor is usually employed, and (a) the combination of the plurality of polymers is particularly preferred. In the case where both components to be phase-separated have high compatibility, both components fail to generate effective phase separation during a drying step for evaporating the solvent, and as a result the layer obtained therefrom deteriorates functions as an anti-glare layer.

Incidentally, the thermoplastic resin and the curable resin precursor (or cured resin) are usually incompatible with each other. When the polymer and the curable resin precursor are incompatible with each other and are phase-separated, a plurality of polymers may be used as the polymer. In the case of using a plurality of polymer, at least one polymer needs only to be incompatible with the resin precursor (or cured resin), and other polymer(s) may be compatible with the resin precursor.

Moreover, the above-mentioned combination may be a combination of two thermoplastic resins incompatible with each other with a curable compound (in particular a monomer or oligomer having a plurality of curable functional groups). Further, from the viewpoint of abrasion resistance after curing, one polymer of the above-mentioned incompatible thermoplastic resins (particularly both polymers) may be a thermoplastic resin having a functional group participating or reacting in a curing reaction (a functional group participating or reacting in curing of the curable resin precursor).

In the case where the polymer comprises a plurality of polymers incompatible with each other to form phase separation, it is preferred that the curable resin precursor is compatible with at least one polymer each other in the neighborhood of a processing temperature, among a plurality of polymers incompatible with each other. That is, when a plurality of polymers incompatible with each other comprise, for example, a first resin and a second resin, the curable resin precursor needs only to be compatible with at least one of the first resin and the second resin, or may be preferably compatible with both resin components. In the case where the curable resin precursor is compatible with both resin components, at least two phases which are phase-separated are obtained, one phase comprises a mixture containing the first resin and the curable resin precursor as main components, the other phase comprises a mixture containing the second resin and the curable resin precursor as main components.

In the case where a plurality of polymers to be selected have high compatibility, the polymers fail to generate effective phase separation among themselves during a drying step for evaporating the solvent, and as a result the layer obtained therefrom deteriorates functions as an anti-glare layer. The phase separability among a plurality of polymers can be judged conveniently by visually conforming whether the residual solid content becomes clouded or not during a step of preparing a uniform solution with a good solvent to both components and gradually evaporating the solvent.

Further, the polymer and a cured or crosslinked resin obtained by curing the resin precursor are usually different from each other in refraction index. Further, the plurality of polymers (the first resin and the second resin) is also different from each other in refraction index. The difference in the refraction index between the polymer and the cured or crosslinked resin, or the difference in the refraction index between the plurality of polymers (the first resin and the second resin) may, for example, be about 0.001 to 0.2, and preferably about 0.05 to 0.15.

In the spinodal decomposition, with the progress of the phase separation, the bicontinuous structure is formed. On further proceeding the phase separation, the continuous phase becomes discontinuous owing to its own surface tension to change into the droplet phase structure (e.g., an islands-in-the-sea structure containing independent phases such as ball-like shape, spherical shape, discotic shape or oval-sphere shape). Therefore, an intermediate structure of the bicontinuous phase structure and the drop phase structure (i.e., a phase structure in a transitional state from the bicontinuous phase to the drop phase) can also be formed by varying the degree of phase separation. The phase separation structure in the anti-glare layer of the present invention may be an islands-in-the-sea structure (a droplet phase structure, or a phase structure in which one phase is independent or isolated) or a bicontinuous phase structure (or a mesh structure), or may be an intermediate structure being a coexistent state of a bicontinuous phase structure and a droplet phase structure. The phase separation structure realizes the formation of a finely uneven structure on the surface of thus obtained anti-glare layer after drying of the solvent.

In the phase separation structure, it is advantageous from the viewpoint of forming the uneven surface structure and of enhancing the surface hardness that the structure forms a droplet phase structure having at least an island domain. Incidentally, when the phase separation structure comprising a polymer and the above-mentioned precursor (or cured resin) forms an islands-in-the-sea structure, the polymer component may form a sea phase. It is however advantageous from the viewpoint of surface hardness that the polymer component forms island domains. The formation of the island domains realizes a finely uneven structure on the surface of thus obtained anti-glare layer after drying.

Further, the average distance between domains of the above-mentioned phase separation structure usually has a substantial regularity or periodicity. For example, the average distance between phases of domains may be about 1 to 70 μm (e.g., about 1 to 40 μm), preferably about 2 to 50 μm (e.g., about 3 to 30 μm), and more preferably about 5 to 20 μm (e.g., about 10 to 20 μm).

The ratio (weight ratio) of the polymer relative to the curable resin precursor is not particularly limited, and for example, the polymer/the curable resin precursor may be selected within the range of about 5/95 to 95/5. From the viewpoint of surface hardness, the ratio (weight ratio) is preferably about 5/95 to 60/40, more preferably about 10/90 to 50/50, and particularly about 10/90 to 40/60.

As described above, the anti-glare film may comprise an anti-glare layer alone, or a support and an anti-glare layer formed thereon. As the support, there may be used a support having light transmittance properties, for example, a transparent support such as a synthetic resin film. Moreover, the support having light transmittance properties may comprise a transparent polymer film for forming an optical member.

(Transparent Support)

As the transparent support (or substrate sheet), there may be exemplified a resin sheet in addition to glass and ceramics. As a resin constituting the transparent support, the resin similar to that of the anti-glare layer can be used. The preferred transparent support includes a transparent polymer film, for example, a film formed with a cellulose derivative [e.g., a cellulose acetate such as cellulose triacetate (TAC) and cellulose diacetate], a polyester-series resin [e.g., a polyethylene terephthalate (PET), a polybutylene terephthalate (PBT), a polyarylate-series resin], a polysulfone-series resin [e.g., a polysulfone, a polyether sulfone (PES)], a polyether ketone-series resin [e.g., a polyether ketone (PEK), a polyether ether ketone (PEEK)], a polycarbonate-series resin (PC), a polyolefinic resin (e.g., a polyethylene, a polypropylene), a cyclic polyolefinic resin (e.g., ARTON, ZEONEX), a halogen-containing resin (e.g., a polyvinylidene chloride), a (meth)acrylic resin, a styrenic resin (e.g., a polystyrene), a vinyl acetate or vinyl alcohol-series resin (e.g., a polyvinyl alcohol) and others. The transparent support may be stretched monoaxially or biaxially, and the transparent support having optical isotropy is preferred. The preferred transparent support is a support sheet or film having a low birefringence index. The optically isotropic transparent support comprises a non-stretched sheet or film, and includes a sheet or film composed of, for example, a polyester (e.g., a PET, a PBT), a cellulose ester, in particular a cellulose acetate (e.g., a cellulose acetate such as a cellulose diacetate and a cellulose triacetate, an acetic acid and a $C_{3-4}$ organic acid ester of cellulose such as a cellulose acetate propionate and a cellulose acetate butyrate) or the like. The thickness of the support having two-dimensional structure may be selected within the range of, for example, about 5 to 2000 μm, preferably about 15 to 1000 μm, and more preferably about 20 to 500 μm.

(Optical Member)

The anti-glare layer has not only high anti-glareness but also high light-scattering properties. In particular, the anti-glare film can enhance scattered intensities in a range of a specific angle with isotropically transmitting and scattering the transmitted light. Further, the anti-glare film also has high visibility of a transmitted image. The above-mentioned support, accordingly, may comprise a transparent polymer film for forming various optical members. The anti-glare film obtained in combination with the transparent polymer film may be directly used as an optical member, or may form an optical member in combination with an optical element [for example, a variety of optical elements which are disposed into a light path thereof, e.g., a polarizing plate, an optical retardation plate (or phase plate), and a light guide plate (or light guide)]. That is, the anti-glare film may be disposed or laminated on at least one light path surface of an optical element. For example, the anti-glare film may be laminated on at least one surface of the optical retardation plate, or may be disposed or laminated on an emerging surface (or emerge surface) of the light guide plate.

The anti-glare film in which abrasion resistance is imparted to an anti-glare layer thereof can be also performed as a protective film. The anti-glare film of the present invention is, therefore, suitable for utilizing as a laminate (optical member) in which an anti-glare film is used instead of at least one protective film among two protective films constituting a polarizing plate, that is, as a laminate (optical member) in which an anti-glare film is laminated on at least one surface of a polarizing plate.

The thickness of the anti-glare layer is, for example, about 0.3 to 20 μm, preferably about 1 to 15 μm (e.g., about 1 to 10 μm), and usually about 2 to 10 μm (particularly about 3 to 7 μm). In the case where the anti-glare film comprises an anti-glare layer alone, the thickness of the anti-glare layer may, for example, be selected within the range of about 1 to 100 μm, preferably about 3 to 50 μm.

In such an anti-glare film (that is, an anti-glare layer, or a laminate of a transparent support and an anti-glare layer), finely uneven structure corresponding to the above-mentioned phase separation structure is formed in large quantity on the surface of the anti-glare layer. Thus, the anti-glare film is capable of preventing reflection of a surrounding scenery caused by surface reflection, and can enhance anti-glareness.

Further as described above, in the phase separation structure, the average distance between phases of domains substantially has regularity or periodicity. The light incident and transmitted on (through) the anti-glare film, therefore, shows maximum (local maximum) of the scattered light at a specific angle away from the rectilinear transmitted light by Bragg reflection corresponding to the average distance between phases (or regularity of the uneven surface structure). That is, the anti-glare film of the present invention isotropically transmits and scatters or diffuses an incident light, while the scattered light (transmitted scattered-light) shows maximum value of the light intensity at a scattering angle which is shifted from the scattering center [for example, at about 0.1 to 10°, preferably about 1 to 10° (e.g., about 1 to 8°), more preferably about 1.5 to 8 20, and particularly about 1.5 to 5° (e.g., about 2 to 5°)]. The use of the anti-glare film accordingly avoids the problem of dazzle which was insoluble with the use of a conventional fine particle-dispersed anti-glare sheet, because the scattered light through the uneven surface structure adversely affects the profile of rectilinear transmitted light.

Concerning an angle distribution profile of a scattered light intensity, the maximal value of the above-mentioned scattered light may form peak-shapes separated each other. Even when the angle distribution profile has a shoulder-shaped peak or a flat-shaped peak, it is regarded that the scattered light has the maximum value.

Incidentally, the angle distribution of the light transmitted through the anti-glare film can be measured by means of a measuring equipment comprising a laser beam source 1 such as He—Ne laser, and a beam receiver 4 set on a goniometer, as shown in FIG. 1. In the embodiment, the relationship between the scattered light intensity and the scattering angle θ is determined by irradiating a sample 3 with a laser beam from the laser beam source 1 through a ND filter 2, and detecting the scattered light from the sample by means of a detector (beam receiver) 4 which is capable of varying an angle at a scattering angle θ relative to a light path of the laser beam and comprises a photomultiplier. As such an equipment, an automatic measuring equipment for laser beam scatteration (manufactured by NEOARK Corporation) is utilizable.

The anti-glareness can be evaluated by visual observation of a fluorescent tube reflection, and with a gloss meter according to JIS K7105. Further, dazzle and blur of images can be evaluated by means of a high definition liquid crystal display apparatus having resolution of about 200 ppi, and more simply, can be visually evaluated by means of a high definition CRT display apparatus, or a simple evaluation apparatus comprising a color filter for liquid crystal having resolution of about 150 ppi in combination with a backlight.

The total light transmittance of the anti-glare film of the present invention is, for example, about 70 to 100%, preferably about 80 to 100%, more preferably about 85 to 100% (e.g., about 85 to 95%), and particularly about 90 to 100% (e.g., about 90 to 99%).

The haze of the anti-glare film of the present invention is about 20 to 50%, preferably about 30 to 50%, and more preferably about 35 to 45%.

The haze and the total light transmittance can be measured with a NDH-300A haze meter manufactured by Nippon Denshoku Industries Co., Ltd. in accordance with JIS K7105.

The visibility of a transmitted image of the anti-glare film of the present invention is, in the case using an optical slit of 0.5 mm width, about 70 to 100%, and preferably about 80 to 100%. When the visibility of a transmitted image is within the above range, the anti-glare film realizes prevention of vagueness or unclearness of the pixel border, even in a high definition display apparatus, due to low defocusing of the transmitted light, and as a result, realizes prevention of blur of images.

The visibility of a transmitted image is a measure for quantifying defocusing or distortion of a light transmitted through a film. The visibility of a transmitted image is obtained by measuring a transmitted light from a film through a movable optical slit, and calculating amount of light in both a light part and a dark part of the optical slit. That is, in the case where a transmitted light is defocused by a film, the slit image formed on the optical slit becomes thicker, and as a result the amount of light in the transmitted part is not more than 100%. On the other hand, in the non-transmitted part, the amount of light is not less than 0% due to leakage of light. The value C of the visibility of a transmitted image is defined by the following formula according to the maximum value M of the transmitted light in the transmitted part of the optical slit, and the minimum value m of the transmitted light in the non-transmitted part thereof.

$$C(\%) = [(M-m)/(M+m)] \times 100$$

That is, the closer the value C comes to 100%, the lower the image defocusing depending on the anti-glare film is. [reference; Suga and Mitamura, Tosou Gijutsu, July, 1985].

As an apparatus for measuring the visibility of a transmitted image, there may be used an image clarity measuring apparatus ICM-1DP (manufactured by Suga Test Instruments Co., Ltd.). As the optical slit, there may be used an optical slit of 0.125 mm to 2 mm width.

The solvent to be used in wet spinodal decomposition may be selected depending on the species and solubility of the polymer and the curable resin precursor, and needs only to be a solvent for uniformly dissolving at least solid content (a plurality of polymers and curable resin precursor(s), a reaction initiator, other additive(s)). As such a solvent, there may be mentioned, for example, a ketone (e.g., acetone, methyl ethyl ketone, methyl isobutyl ketone, cyclohexanone), an ether (e.g., dioxane, tetrahydrofuran), an aliphatic hydrocarbon (e.g., hexane), an alicyclic hydrocarbon (e.g., cyclohexane), an aromatic hydrocarbon (e.g., toluene, xylene), a carbon halide (e.g., dichloromethane, dichloroethane), an ester (e.g., methyl acetate, ethyl acetate, butyl acetate), water, an alcohol (e.g., ethanol, isopropanol, butanol, cyclohexanol), a cellosolve (e.g., methyl cellosolve, ethyl cellosolve), a cellosolve acetate, a sulfoxide (e.g., dimethyl sulfoxide), and an amide (e.g., dimethylformamide, dimethyhlacetamide). Moreover, the solvent may be a mixed solvent.

The anti-glare film of the present invention can be obtained, with the use of a liquid phase (or a liquid-like composition) containing the polymer, the curable resin precursor and the solvent, through a step for forming a phase separation structure by spinodal decomposition from the liquid phase (or the liquid-like composition) concurrent with evaporation of the solvent; and a step for curing the curable resin precursor to form at least an anti-glare layer. The phase separation process usually comprises a step for coating or casting (flow casting) a liquid mixture containing the polymer, the curable resin precursor and the solvent (particularly a liquid composition such as a uniform solution) on the support; and a step for evaporating the solvent from the coating layer or casting layer to form a phase separation structure having a regular or periodical average distance between phases. An anti-glare film can be obtained by curing the precursor. In the preferred embodiment, as the liquid mixture, there may be used a composition containing the thermoplastic resin, the photo-curable compound, the photopolymerization initiator, and the solvent for dissolving the thermoplastic resin and the photo-curable compound. The photo-curable component in a phase separation structure formed by spinodal decomposition is cured with a light irradiation to obtain an anti-glare layer. In another preferred embodiment, as the liquid mixture, there may be used a composition containing the plurality of polymers incompatible with each other, the photo-curable compound, the photopolymerization initiator, and the solvent. The photo-curable component having a phase separation structure formed by spinodal decomposition is cured with a light irradiation to obtain an anti-glare layer.

The concentration of the solute (the polymer, the curable resin precursor, the reaction initiator, and other additive(s)) in the liquid mixture can be selected within the range causing the phase separation and not deteriorating castability and coatability, and is, for example, about 1 to 80% by weight, preferably about 5 to 60% by weight, and more preferably about 15 to 40% by weight (particularly about 20 to 40% by weight).

Incidentally, when the liquid mixture is coated on a transparent support, the transparent support sometimes dissolves or swells according to the species of solvents. For example, when a coating liquid (uniform solution) containing a plurality of resins is coated on a cellulose triacetate film, the coating surface of the cellulose triacetate film sometimes elutes, corrodes, or swells according to the species of solvents. In this case, the coating surface of the transparent support (e.g., cellulose triacetate film) may be applied with a solvent-resisting coating agent in advance to form an optically isotropic coating layer with solvent resistance. Such a coating layer can be formed with, for example, a thermoplastic resin such as an AS resin, a polyester-series resin, and a polyvinyl alcohol-series resin (e.g., a polyvinyl alcohol, an ethylene-vinyl alcohol copolymer), a curable resin (setting resin) such as an epoxy resin, a silicone-series resin, and an ultraviolet curable resin.

Moreover, when a liquid mixture or coating liquid is coated on a transparent support, a solvent in which the transparent support does not dissolve, corrode or swell may be selected according to the species of the transparent support. For example, when a cellulose triacetate film is employed as the transparent support, tetrahydrofuran, methyl ethyl ketone, isopropanol, toluene or the like is used as a solvent for the liquid mixture or the coating liquid and thus the anti-glare layer can be formed without deteriorating properties of the film.

After the liquid mixture is cast or coated, phase separation by spinodal decomposition can be induced by evaporating or removing the solvent at a temperature of less than a boiling point of the solvent (e.g., a temperature lower than a boiling point of the solvent by about 1 to 120° C., preferably about 5 to 50° C., in particular about 10 to 50° C.). The evaporation or removal of the solvent may be usually carried out by drying, for example drying at an temperature of about 3 to 200° C. (e.g., about 30 to 100° C.), preferably about 40 to 120° C., and more preferably about 40 to 80° C. according to the boiling point of the solvent.

Such spinodal decomposition accompanied by evaporation of the solvent imparts regularity and periodicity to the average distance between domains of the phase separation structure. Then, the phase separation structure formed by spinodal decomposition can be immediately fixed by curing the precursor. The curing of the precursor can be carried out with applying heat, light irradiation, or a combination of these methods depending on the species of curable resin precursor. The heating temperature may be selected within the appropriate range as far as having the phase separation structure, for example, within about 50 to 150° C., or may be selected within the temperature range similar to that in the above-mentioned phase separation process.

Light irradiation can be selected depending on the species of the photo-curable component or the like, and ultraviolet ray, electron beam or the like is usually available for light irradiation. The general-purpose light source for exposure is usually an ultraviolet irradiation equipment. If necessary, light irradiation may be carried out under an inert gas atmosphere.

[Display Apparatus]

The anti-glare film of the present invention has hardcoat (or hardcoating) properties and high anti-glareness. Moreover, the anti-glare film realizes enhancement of scattered light intensities in a range of a specific angle with isotropically transmitting and scattering the transmitted light. Further, the anti-glare film is excellent in the visibility of a transmitted image, and low in blur of images in a display surface. The anti-glare film or optical member of the present invention, therefore, can be utilized for various display apparatuses or devices such as a liquid crystal display (LCD) apparatus, a plasma display, and a touch panel-equipped display device. These display apparatuses comprise the anti-glare film or the optical member (particularly, e.g., a laminate of a polarizing plate and an anti-glare film) as an optical element.

Incidentally, the liquid crystal display apparatus may be a reflective liquid crystal display apparatus which illuminates a display unit comprising a liquid crystal cell with the use of an external light (or outside light), or may be a transmissive liquid crystal display apparatus comprising a backlight unit for illuminating a display unit. In the reflective liquid crystal display apparatus, the display unit can be illuminated by taking in an incident light from the outside through the display unit, and reflecting the transmitted light by a reflective member. In the reflective liquid crystal display apparatus, the anti-glare film or optical member (particularly a laminate of a polarizing plate and an anti-glare film) can be disposed in a forward light path from the reflective member. For example, the anti-glare film or optical member can be disposed or laminated between the reflective member and the display unit, in front of the display unit, or others.

In the transmissive liquid crystal display apparatus, the backlight unit may comprise a light guide plate (e.g., a light guide plate having awedge-shaped cross section) for allowing a light from a light source (e.g., a tubular light source such as a cold cathode tube, a point light source such as a light emitting diode) incident from one side of the light guide plate and for allowing the incident light from the front emerging surface to emit. Moreover, if necessary, a prism sheet may be disposed in front of the light guide plate. Incidentally, a reflective member for allowing a light obtained from the light source to the emerging surface side to reflect is usually disposed on the reverse side of the light guide plate. In such a transmissive liquid crystal display apparatus, the anti-glare film or the optical member may be usually disposed into a light path in front of the light source. For example, the anti-glare film or optical member can be disposed or laminated between the light guide plate and the display unit, in front of the display unit, or others.

The present invention is useful for a variety of application in need of anti-glareness and light-scattering properties, e.g., for the optical member or an optical element of a display apparatus such as a liquid crystal display apparatus (in particular, a high definition or high colorfulness display apparatus).

According to the present invention, through the phase separation utilizing spinodal decomposition from a liquid phase, an anti-glare film has high anti-glareness and effectively prevents dazzle or blur of images with effectively preventing reflection of a surrounding scenery and dazzle in a display surface even in a high definition display apparatus. Further, the anti-glare film of the present invention also realizes high abrasion resistance (high hardcoating properties) and control over the intensity distribution of the transmitted scattered-light. Furthermore, the present invention ensures that an anti-glare film or an optical member is produced by spinodal decomposition from a liquid phase at a lower cost.

EXAMPLES

The following examples are intended to describe this invention in further detail and should by no means be interpreted as defining the scope of the invention.

Example 1

Four parts by weight of a styrene-acrylonitrile copolymer (acrylonitrile content: 24% by weight, number average molecular weight: 33000; manufactured by Daicel Polymer, Ltd., 290FF), 2 parts by weight of a cellulose acetate propionate (acetate content=2.5%, propionate content=46%, number average molecular weight in terms of polystyrene: 75000; manufactured by Eastman, Ltd., CAP-482-20), 14 parts by weight of apolyfunctional acrylic ultraviolet (UV) curable compound (manufactured by Daicel UCB Co., Ltd., KRM7039), and 0.7 part by weight of a photo initiator (IRGACURE 184; manufactured by Ciba-Geigy Ltd.) were dissolved in 80 parts by weight of a mixed solvent containing methyl ethyl ketone and isopropanol [methyl ethyl ketone/isopropanol=7/3 (weight ratio)]. This solution was cast on a cellulose triacetate film with the use of a wire bar #20, then the film was allowed to stand in an oven at 60° C. for 2 minutes, and the solvent was evaporated to form a coat layer about 5 μm thick. Following that, the coat layer was subjected to UV curing treatment for about 5 seconds by irradiating ultraviolet ray derived from a metal halide lump.

Figure 2:
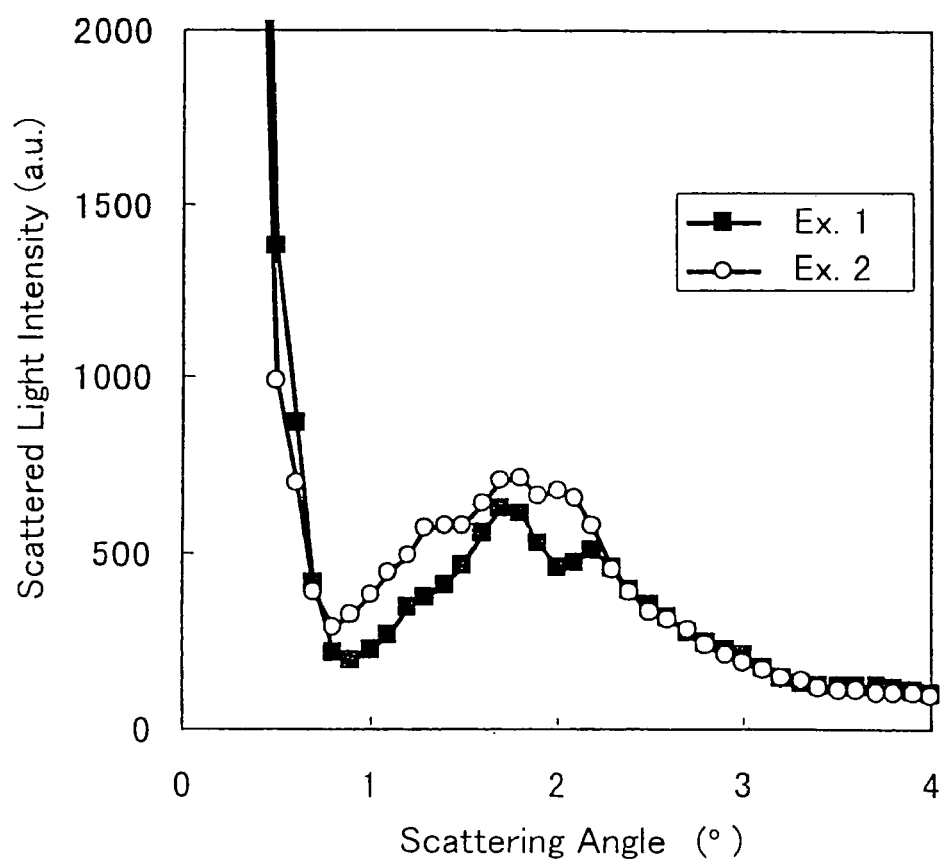
FIG. 2 is a graph showing the relationship between scattered light intensities and scattering angles obtained in Examples 1 and 2.

When the coat layer was observed with a transmission optical microscope, the coat layer was found to have a droplet phase separation structure. Moreover, when the angle distribution of the transmitted light was measured with the equipment shown in FIG. 1, the scattering light was observed in an angle range of 0.9 to 3.3° which was separated from the rectilinear transmitted light as shown in FIG. 2, and the maximum position of the scatteration was 1.7°. The gloss measured at an angle of 60° in accordance with JIS K7105 was 49. Measuring with a hazemeter (manufactured by Nippon Denshoku Industries Co., Ltd., NDH-300A) in accordance with JISK7105, the total light transmittance (transparency) and the haze value of the sheet were 91% and 21%, respectively. The pencil hardness test with load of 500 g was measured and found to be 2H. When the sheet obtained in Example 1 was attached on a high-resolution CRT monitor, dazzle in display was unrecognized. Moreover, the sheet had no reflection of interior fluorescent tube, and was excellent in anti-glareness.

Example 2

Four parts by weight of a styrene-acrylonitrile copolymer (acrylonitrile content: 33% by weight, number average molecular weight: 30000; manufactured by Daicel Polymer, Ltd., 290ZF), 2 parts by weight of a cellulose acetate propionate (acetate content=2.5%, propionate content=46%, number average molecular weight in terms of polystyrene: 75000; manufactured by Eastman, Ltd., CAP-482-20), 14 parts by weight of a polyfunctional acrylic UV curable compound (pentaerythritol triacrylate), and 0.7 part by weight of a photo initiator (IRGACURE 184; manufactured by Ciba-Geigy Ltd.) were dissolved in 80 parts by weight of a mixed solvent containing methyl ethyl ketone and isopropanol [methyl ethyl ketone/isopropanol=7/3 (weight ratio)]. This solution was cast on a cellulose triacetate film with the use of a wire bar #14, then the film was allowed to stand in an oven at 60° C. for 2 minutes, and the solvent was evaporate to form a coat layer about 5 μm thick. Following that, the coat layer was subjected to UV curing treatment for about 5 seconds by irradiating ultraviolet ray derived from a metal halide lump.

When the coat layer was observed with a transmission optical microscope, the coat layer was found to have a droplet phase separation structure. Moreover, when the angle distribution of the transmitted light was measured with the equipment shown in FIG. 1, the scattering light was observed in an angle range of 0.8 to 3.3° which was separated from the rectilinear transmitted light as shown in FIG. 2, and the maximum position of the scatteration was 1.8°. The gloss measured at an angle of 60° in accordance with JIS K7105 was 48. Measuring with a hazemeter (manufactured by Nippon Denshoku Industries Co., Ltd., NDH-300A) in accordance with JISK7105, the total light transmittance and the haze value of the sheet were 91% and 24%, respectively. The pencil hardness test with load of 500 g was measured, and found to be 2H. When the sheet obtained in Example 1 was attached on a high-resolution CRT monitor, dazzle in display was unrecognized. Moreover, the sheet had no reflection of interior fluorescent tube, and was excellent in anti-glareness.

Example 3

In 37.15 parts by weight of tetrahydrofuran were dissolved 5.65 parts by weight of an acrylic resin having a polymerizable unsaturated group(s) in a side chain thereof [a compound in which 3,4-epoxycyclohexenyl methyl acrylate is added to part of carboxyl groups in a (meth)acrylic acid-(meth)acrylic ester copolymer; manufactured by Daicel Chemical Industries, Ltd., CYCLOMER-P (ACA) 320M, solid content: 49.6% by weight], 1.2 parts by weight of a cellulose acetate propionate (acetate content=2.5%, propionate content=46%, number average molecular weight in terms of polystyrene: 75000; manufactured by Eastman, Ltd., CAP-482-20), 6 parts by weight of a polyfunctional acrylic UV curable compound (manufactured by Daicel UCB Co., Ltd., DPHA), 0.77 part by weight of a silicone-containing acrylic UV curable compound (manufactured by Daicel UCB Co., Ltd., EB1360), and 0.53 part by weight of a photo initiator (manufactured by Ciba Specialty Chemicals K.K., IRGACURE 184). This solution was cast on a cellulose triacetate film with the use of a wire bar #24, then the film was allowed to stand in an oven at 80° C. for 3 minutes, and the solvent was evaporated to form a coat layer about 7 μm thick. Following that, the coat layer was subjected to UV curing treatment for about 30 seconds by irradiating ultraviolet ray derived from a metal halide lump (manufactured by Eyegraphics Co., Ltd.).

Example 4

In 37.36 parts by weight of tetrahydrofuran were dissolved 5.24 parts by weight of an acrylic resin having a polymerizable unsaturated group(s) in a side chain thereof [manufactured by Daicel Chemical Industries, Ltd., CYCLOMER-P (ACA) 320M], 1.1 parts by weight of a cellulose acetate propionate (manufactured by Eastman, Ltd., CAP-482-20), 6.3 parts by weight of a polyfunctional acrylic UV curable compound (manufactured by Daicel UCB Co., Ltd., DPHA), 0.76 part by weight of a silicone-containing acrylic UV curable compound (manufactured by Daicel UCB Co., Ltd., EB1360), and 0.62 part by weight of a photo initiator (manufactured by Ciba Specialty Chemicals K.K., IRGACURE 184). This solution was cast on a cellulose triacetate film with the use of a wire bar #24, then the film was allowed to stand in an oven at 80° C. for 3 minutes, and the solvent was evaporated to form a coat layer about 7 μm thick. Following that, the coat layer was subjected to UV curing treatment for about 30 seconds by irradiating ultraviolet ray derived from a metal halide lump (manufactured by Eyegraphics Co., Ltd.).

Example 5

In 37.36 parts by weight of tetrahydrofuran were dissolved 5.24 parts by weight of an acrylic resin having a polymerizable unsaturated group(s) in a side chain thereof [manufactured by Daicel Chemical Industries, Ltd., CYCLOMER-P (ACA) 320M], 1.1 parts by weight of a cellulose acetate propionate (manufactured by Eastman, Ltd., CAP-482-20), 6.3 parts by weight of a polyfunctional urethane acrylate UV curable compound (manufactured by Daicel UCB Co., Ltd., EB8301), 0.76 part by weight of a silicone-containing acrylic UV curable compound (manufactured by Daicel UCB Co., Ltd., EB1360), and 0.62 part by weight of a photo initiator (manufactured by Ciba Specialty Chemicals K.K., IRGACURE 184). This solution was cast on a cellulose triacetate film with the use of a wire bar #24, then the film was allowed to stand in an oven at 80° C. for 3 minutes, and the solvent was evaporated to form a coat layer about 7 μm thick. Following that, the coat layer was subjected to UV curing treatment for about 30 seconds by irradiating ultraviolet ray derived from a metal halide lump (manufactured by Eyegraphics Co., Ltd.).

Comparative Example 1

Twenty parts by weight of a polyfunctional acrylic UV curable monomer (manufactured by Daicel UCB Co., Ltd., DPHA), 1.6 parts by weight of an acryl-styrene copolymer beads having the average particle size of 3.5 μm in as a transparent fine particle, 1 part by weight of a photo initiator (manufactured by Ciba Specialty Chemicals K.K., IRGACURE 184) were mixed in 30 parts by weight of a mixed solvent containing tetrahydrofuran and toluene [tetrahydrofuran/toluene=7/3 (weight ratio)] to prepare a dispersion liquid. The dispersion liquid was coated so that the thickness of the coat layer become 3 μm after drying. Following that, the coat layer was subjected to UV curing treatment by irradiating ultraviolet ray derived from a metal halide lump (manufactured by Eyegraphics Co., Ltd.) for about 30 seconds.

Figure 3:
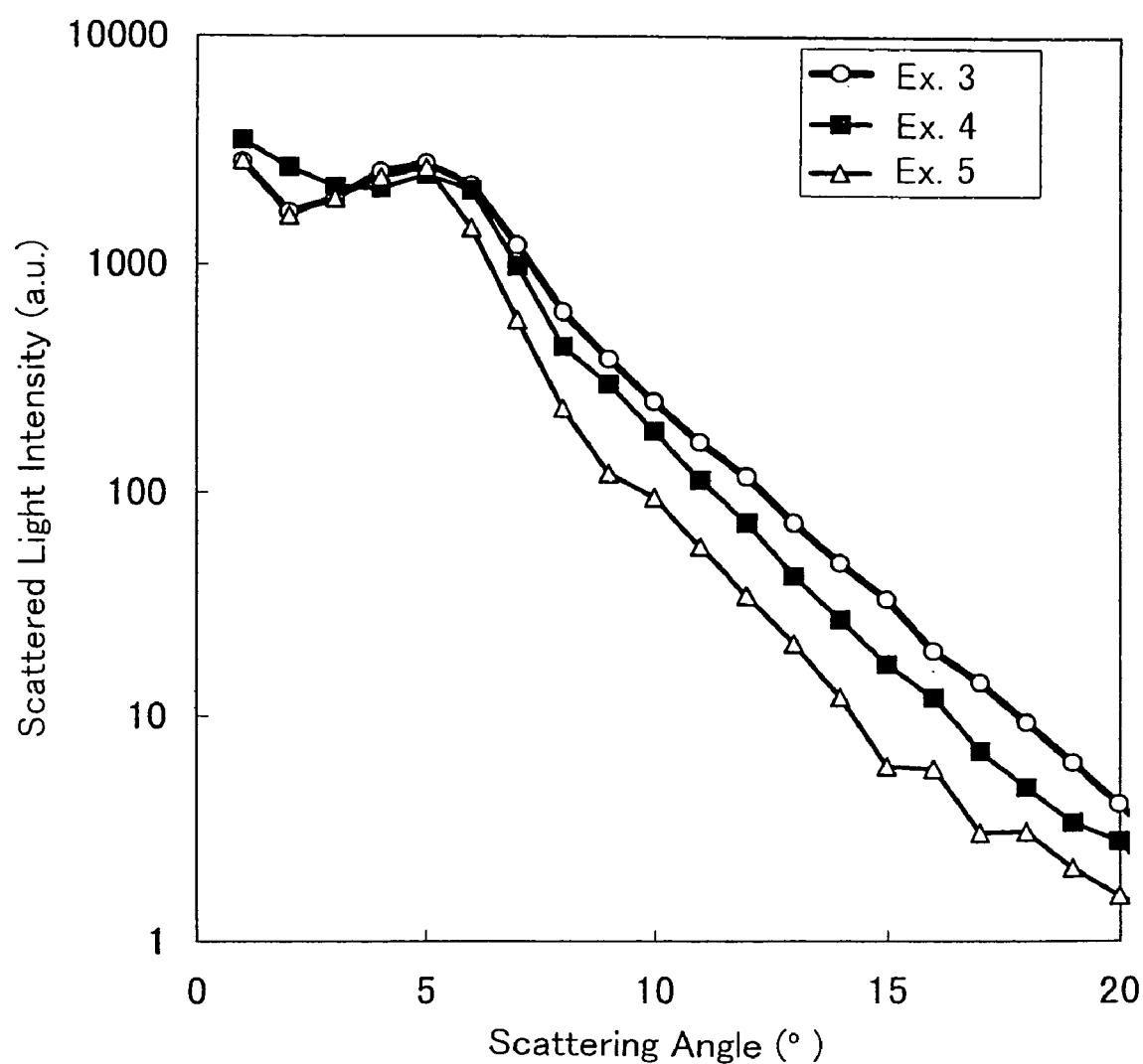
FIG. 3 is a graph showing the relation between scattered light intensities and scattering angles obtained in Examples 3 to 5.

When the anti-glare films obtained in Examples 3 to 5 were observed with a transmission optical microscope, the films were found to have a droplet phase separation structure. Moreover, when the angle distribution of the transmitted light was measured with the equipment shown in FIG. 1, the maximum of the scattering light was observed in the neighborhood of scattering angle of 5° which was separated from the rectilinear transmitted light (scattering angle=0°), as shown in FIG. 3, in any films.

Regarding the anti-glare films obtained by Examples 3 to 5 and Comparative Example 1, the visibility of a transmitted image, the total light transmittance, the haze, the 60° gloss, the pencil hardness with load of 500 g, dazzle, blur of images and anti-glareness were evaluated. The results are shown in Table 1 all together. Incidentally, dazzle, blur of images and anti-glareness were evaluated by the following manners.

(Evaluation of Dazzle)

Dazzle in the display surface was determined by disposing the obtained anti-glare film on a color filter for liquid crystal having 150 ppi resolution, irradiating back light from behind, and visually evaluating dazzle in accordance with the following criteria.
"A": dazzle was unrecognized
"B": dazzle was slightly recognized
"C": dazzle was recognized (Evaluation of Blur of Images)

Blur of images in the display surface was determined by disposing the obtained anti-glare film on a color filter for liquid crystal having 150 ppi resolution, irradiating back light from behind, and visually evaluating dazzle in accordance with the following criteria.
"A": blur of images was unrecognized
"B": blur of images was slightly recognized
"C": blur of images was recognized (Evaluation of Anti-Glareness)

Anti-glareness was determined by projecting a bare fluorescent tube (louver-free fluorescent tube) on the anti-glare film, and visually evaluating glareness of the regular-reflected light in accordance with the following criteria.
"A": glareness was unrecognized
"B": glareness was slightly recognized
"C": glareness was recognized

TABLE 1

|  | Visibility of transmitted image (%) | Total light transmittance (%) | Haze (%) | 60° Gloss | Pencil hardness (load: 500 g) | Dazzle | Blur of images | Anti-glareness |
| --- | --- | --- | --- | --- | --- | --- | --- | --- |
| Ex. 3 | 85 | 91.9 | 44.8 | 22 | 3H | A | B | A |
| Ex. 4 | 83.4 | 91.5 | 41.2 | 24 | 3H | A | B | A |

TABLE 1-continued

|  | Visibility of transmitted image (%) | Total light transmittance (%) | Haze (%) | 60° Gloss | Pencil hardness (load: 500 g) | Dazzle | Blur of images | Anti-glareness |
|---|---|---|---|---|---|---|---|---|
| Ex. 5 | 89.2 | 91.8 | 32.4 | 33 | 2H | A | A | B |
| Com. Ex. 1 | 8 | 91.5 | 27 | 25 | 3H | C | C | A |

It is apparent that the anti-glare film of the present invention has high anti-glareness and effectively prevents dazzle and blur of images in a display surface of a high definition display apparatus.

What is claimed is:

1. A composition for an anti-glare film which comprises a plurality of polymers and at least one curable resin precursor,
    wherein the plurality of polymers are phase-separable by spinodal decomposition from a liquid phase and at least one curable resin precursor is compatible with at least one polymer of the plurality of polymers,
    wherein the at least one curable resin precursor comprises at least one member selected from the group consisting of an epoxy (meth)acrylate, a urethane (meth)acrylate, a polyester (meth)acrylate, a silicone (meth)acrylate, and a polyfunctional monomer having at least two polymerizable unsaturated bonds, and
    wherein the phase-separable plurality of polymers comprises a cellulose derivative and at least one resin selected from the group consisting of a styrenic resin, a (meth)acrylic resin, an alicyclic olefinic resin, a polycarbonate-series resin, and a polyester-series resin, and at least one polymer of the plurality of polymers has a (meth)acryloyl group.

2. A process for producing an anti-glare film comprising at least an anti-glare layer, which comprises forming a phase separation structure by spinodal decomposition from a liquid phase with evaporating a solvent, curing the resin precursor to form the anti-glare layer, and the liquid phase contains at least one polymer, at least one curable resin precursor, and the solvent.

3. A process according to claim 2, which comprises forming a phase separation structure by spinodal decomposition from a composition composed of a thermoplastic resin, a photo-curable compound, a photopolymerization initiator, and a solvent for dissolving the thermoplasdc resin and the photo-curable compound; and forming an anti-glare layer by a light irradiation.

4. A process according to claim 2, which comprises forming a phase separation structure by spinodal decomposition from a composition composed of a thermoplastic resin, a resin being incompatible with the thermoplastic resin and having a photo-curable group, a photo-curable compound, a photopolymerization initiator, and a solvent for dissolving the resin and the photo-curable compound; and forming an anti-glare layer by a light irradiation.

5. A process according to claim 2, which comprises forming at least one anti-glare layer on a transparent support.

* * * * *